Feb. 20, 1934. M. R. HOAG 1,948,264
HEADLIGHT CONSTRUCTION
Filed Aug. 9, 1933 2 Sheets-Sheet 2
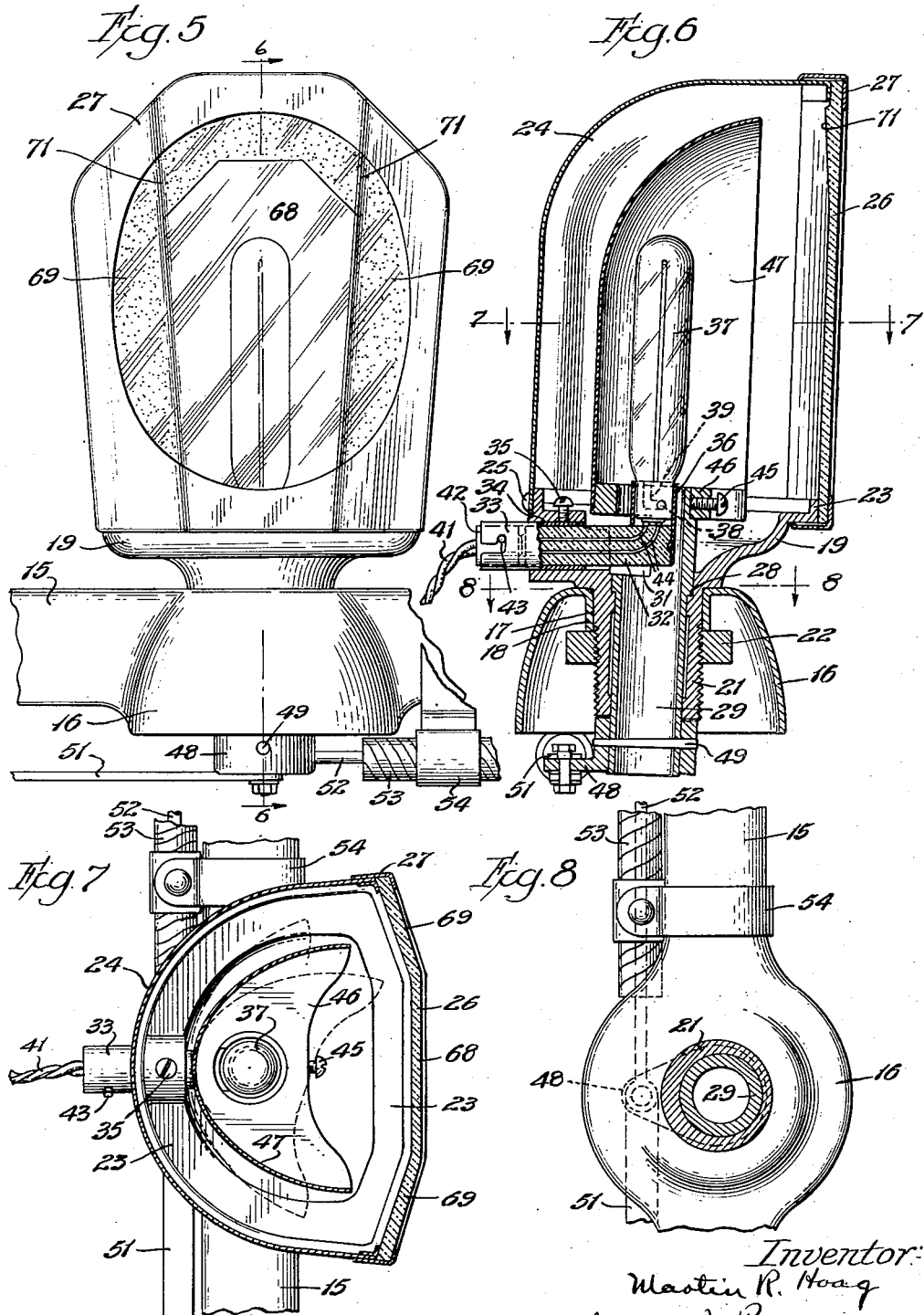
Inventor:
Martin R. Hoag
Charles B. Rasmussen
Atty.

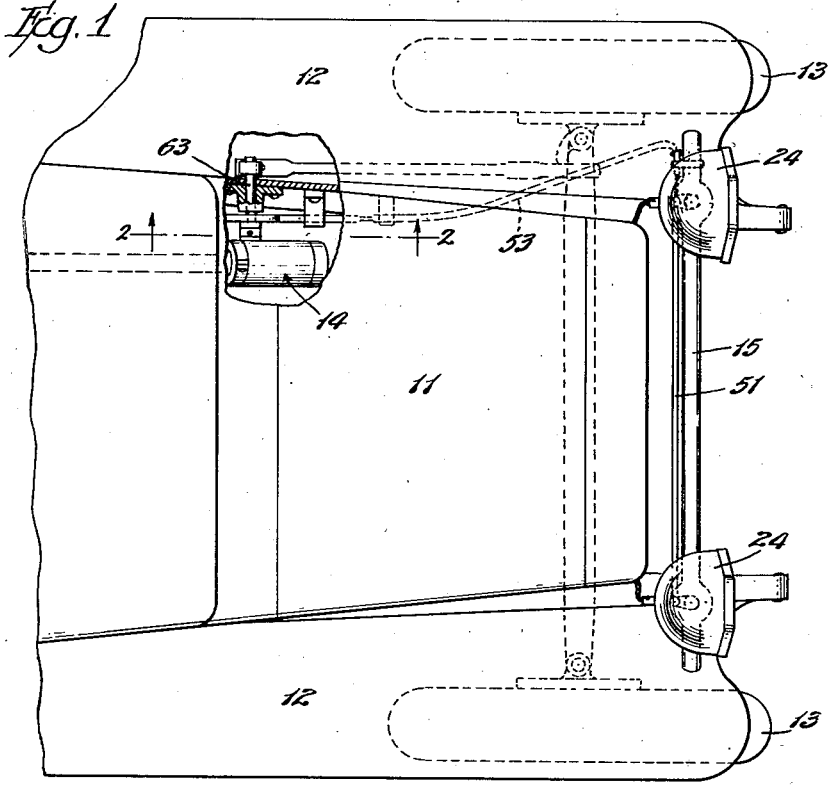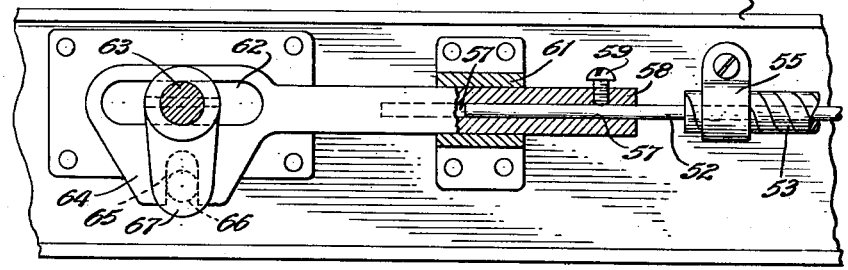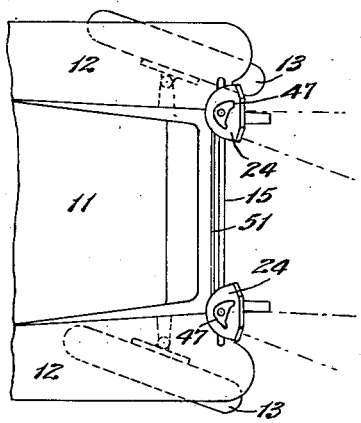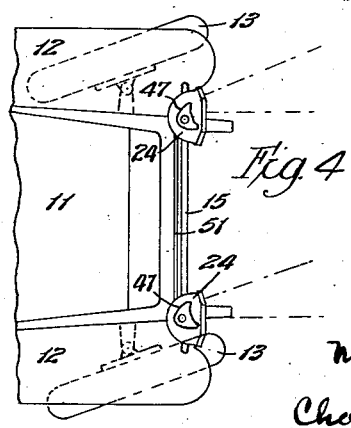

Patented Feb. 20, 1934

1,948,264

UNITED STATES PATENT OFFICE

1,948,264

HEADLIGHT CONSTRUCTION

Martin R. Hoag, Chicago, Ill.

Application August 9, 1933. Serial No. 684,374

3 Claims. (Cl. 240—8.25)

This invention relates to dirigible reflectors and has particular relation to headlights of this type for use in connection with automobiles and the like equipped with a steering mechanism. While the invention will hereinafter be described as being employed in connection with an automobile, it will be readily appreciated that numerous other features are capable of valuable and advantageous use in vehicles of other character provided with a steering mechanism.

One of the principal objects of this invention is the provision of a headlight which is so mounted on an automobile and so connected with the steering mechanism thereof that the reflector will turn automatically in the direction of travel of the automobile when the steering mechanism is actuated, thus at all times illuminating the roadway in front of the automobile even when traveling around relatively abrupt curves and bends in the roadway.

Another important object of the invention is the provision of a headlight assembly for an automobile or the like, employing two spaced headlights the reflectors of which are connected to turn in unison and simultaneously with any change of direction of travel of the automobile imparted thereto by the steering mechanism.

Another important object of the invention is the provision of a novel headlight construction embodying a laterally adjustable hood and a rotatable reflector adapted to automatically turn in accordance with the direction of travel of the automobile.

Another important object of the invention is the provision of a headlight embodying a novel lens construction for permitting a relatively bright beam of light to be projected on the roadway directly in front of the automobile with an area of dimmed or diffused illumination on each side thereof.

Another important object of the invention is the provision of simple and efficient mechanism for operatively connecting the movable reflectors with the steering mechanism of the automobile.

Numerous other objects and advantages of the invention will be apparent as it is better understood from the following description, which, when considered in connection with the accompanying drawings, illustrates a preferred embodiment thereof.

Referring to the drawings,

Figure 1 is a fragmentary diagrammatic plan view, with parts broken away, illustrating the improved headlight construction mounted on the front of an automobile;

Fig. 2 is an enlarged vertical sectional view taken on line 2—2 of Fig. 1, and illustrating the mechanism for operatively connecting the dirigible reflectors with the steering mechanism;

Fig. 3 is a fragmentary diagrammatic plan view of an automobile illustrating the positions of the headlight reflectors when the automobile is turning in one direction;

Fig. 4 is a similar view illustrating the positions of the headlight reflectors when the automobile is turning in an opposite direction;

Fig. 5 is a front elevational view on a larger scale of a dirigible reflector constructed in accordance with the present invention;

Fig. 6 is a vertical sectional view taken on line 6—6 of Fig. 5;

Fig. 7 is a horizontal sectional view taken on line 7—7 of Fig. 6; and

Fig. 8 is a horizontal sectional view taken on line 8—8 of Fig. 6.

A headlight assembly embodying the present invention is shown in Fig. 1 as being mounted on an automobile having the usual hood 11, front mudguards 12, front wheels 13, and steering mechanism indicated generally at 14, which includes in addition to the usual worm and worm gears (not shown), a radius rod and steering knuckle. Suitably mounted at the front of the hood 11 and extending transversely across the front of the automobile is an horizontal lamp bracket 15 of inverted channel construction. This lamp bracket is provided adjacent each of its ends with an enlargement 16 formed with a centrally located opening 17 surrounded by a depending annular flange 18.

Mounted on each of the enlargements 16 is a bracket 19 formed with a depending tubular portion 21 which is mounted within the opening 17 and secured against displacement therefrom by a locknut 22 threaded onto the lower end of the tubular portion 21 for engagement with the lower edge of the flange 18. The bracket 19 is preferably of cast construction and is provided with a substantially semicircular flange 23, to which a hood 24 of pressed metal construction is secured by means of rivets or the like 25. The hood 24 is provided with an opening at its front, which is covered by a lens 26 detachably secured to the hood 24 by means of a peripherally arranged clamping rim 27 of angular section.

The depending tubular portion 21 of the bracket 19 is formed with an internal shoulder 28 for seating engagement with a corresponding shoulder provided on a sleeve 29 extending vertically through the tubular portion 21 of the bracket 19.

The upper end of the sleeve 29 is cut away at one side, as indicated at 31, to provide clearance for an horizontally extending electrical connection 32 of insulating material which is mounted in a sleeve 33 removably secured in an horizontal bore 34 by a set screw 35. The inner end of the insulating member 32 projects into the sleeve 29 and carries a removable socket 36 adapted to receive an elongated electric lamp 37, the base of which is provided with a pin 38 for locking engagement with the usual bayonet joint slot 39 provided in the socket 36.

Electric current is supplied to the lamp 37 from wires 41 which are electrically connected to a plug 42 adapted to be removably locked within the outer end of the sleeve 33 by means of a bayonet joint connection indicated at 43. The plug 42 establishes an electrical connection between the wires 41 and the outer ends of wires 44 which are imbedded in the insulating member 32, and which form a suitable connection at their other ends with the usual electric contacts provided in the base of the lamp 37.

Secured to the upper end of the sleeve 29 by means of a set screw 45 is a plate 46 which carries a vertically elongated parabolic reflector 47 which is so constructed and arranged as to reflect the light rays emanating from the lamp 37 in parallel paths forwardly through the lens 26. From an inspection of Fig. 6, it will be apparent that the axis of the sleeve 29 is inclined slightly with respect to the vertical so that the reflector 47 carried thereby will focus the beam of light thus projected on the roadway at the desired distance ahead of the automobile.

The lower end of the sleeve 29 projects a short distance below the lower end of the tubular portion 21 of the bracket 19 and has an arm 48 fixed thereto by means of a pin 49. This arm extends horizontally rearwardly and is pivotally connected to a horizontally extending transverse rod or bar 51, the other end of which is pivotally connected to the corresponding arm 48 of the other headlight of the assembly. This rod insures that when one of the reflectors 47 is turned in the manner to be described, the reflector of the associated headlight will be turned in unison therewith and in the same direction.

One of the arms 48 is connected to one end of a flexible steel shaft 52 which is slidably mounted in a flexible metallic tube or guide 53 carried by clips 54 and 55 secured to the bracket 15 and to a side frame element 56 of the automobile respectively. The other end of the flexible shaft 52 is adjustably secured within an elongated bore 57 formed in one end of a member 58 by means of a set screw 59. This member is mounted in a bearing 61 for horizontal sliding movement and is formed at its opposite end with an elongated slot 62 for engagement with the shaft 63 of the steering mechanism 14. The member 58 is also provided with a depending enlargement 64 formed with a notch or recess 65 for engagement by a roller 66 carried by an arm 67 which is fixed to the shaft 63.

From the foregoing it will be apparent that when the steering mechanism is operated to alter the direction of travel of the automobile, the shaft 63 will be rocked, thus causing the arm 67 to shift the member 58 longitudinally in its bearing 61. This movement of the member 58 causes the flexible shaft 52 to slide longitudinally within the guiding and supporting tube 53, thus transmitting horizontal swinging movement to both of the arms 48 of the headlight assembly.

This causes a partial rotation of the sleeves 29 within the tubular portions 21 of the headlights and a corresponding movement of the reflectors 47 carried thereby, so as to swing the beams of light projected by the headlights in the altered direction of travel of the automobile.

The movable reflectors 47 are completely housed within the hood so that their bearing elements are protected from the weather and foreign matter, such as road dirt. Inasmuch as these reflectors are of relatively light weight, they offer practically no additional resistance to the movement of the steering mechanism. These reflectors may obviously be connected directly to the steering knuckles of the machine, if so desired.

The improved headlight assembly hereinabove described completely eliminates the danger resulting from unilluminated areas universally encountered when the direction of travel of an automobile equipped with fixed headlights is abruptly altered.

The lens 26 is formed with a substantially flat central portion 68 of clear glass and with rearwardly inclined side portions 69 increasing in thickness outwardly. This construction results in a relatively bright beam of light being projected forwardly through the lens to illuminate the roadway directly in front of the automobile. The light rays passing through the inclined portions 69 of the lens are refracted to some extent so as to cause an area of illumination on each side of the main beam of lesser intensity so as to minimize the glare common to most headlights. The diverging front and rear surfaces of the side portions 69 of the lens also contribute towards the refraction of light rays passing therethrough. These portions of the lens may be frosted, if desired, as indicated in Fig. 5 of the drawings, so as to further diffuse and soften the light rays passing therethrough. Obviously these inclined side portions 69 of the lens may be of such construction and configuration as to produce the desired optical effect so as to either lessen or intensify the light beams projected therethrough by the reflector 47.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A headlight for automobiles and the like having a steering mechanism, comprising a support, a bracket having a depending tubular stud portion fixedly mounted in said support, a hood member carried by said bracket and open at the front, a lens disposed in the open front of said hood, a sleeve rotatably mounted in the tubular portion of said bracket and provided with a cut away portion adjacent to the upper end thereof, a reflector fixed to the upper end of said sleeve, a lamp socket carried by said bracket and extending through the cut away portion of said tubular member, a lamp carried by said socket in axial alinement with said tubular member, and means fixed to the lower end of said sleeve beneath the tubular portion of said bracket and operatively connected with the steering mechanism for rotating said sleeve and the reflector carried thereby, to vary the direction of the light rays reflected through said lens.

2. A headlight for automobiles and the like having a steering mechanism, comprising a support, a bracket having a depending tubular stud portion fixedly mounted in said support and a transversely extending bore, a hood member carried by said bracket and open at the front, a lens disposed in the open front of said hood, a sleeve rotatably mounted in the tubular portion of said bracket and provided with a cut away portion adjacent the upper end thereof, a reflector fixed to the upper end of said sleeve, a lamp socket removably mounted in said transverse bore and extending through the cut away portion of said tubular member, a lamp carried by said socket, and means fixed to the lower end of said sleeve beneath the tubular portion of said bracket and operatively connected with the steering mechanism for rotating said sleeve and the reflector carried thereby, to vary the direction of the light rays reflected through said lens in accordance with the direction of travel of the automobile.

3. A headlight for automobiles and the like having a steering mechanism, comprising a support having a tubular portion, a bracket having a depending stud portion extending through the said tubular portion, for adjustment about a vertical axis, a nut threaded onto the lower end of said stud portion for engagement with the said tubular portion of said support to maintain said bracket in adjusted position, a hood member carried by said bracket and open at the front, a lens disposed in the open front of said hood, a sleeve rotatably mounted in the tubular portion of said bracket and provided with a cut away portion adjacent the upper end thereof, a reflector fixed to the upper end of said sleeve, a lamp socket carried by said bracket and extending through the cut away portion of said tubular member, a lamp carried by said socket, and means operatively connecting said sleeve with said steering mechanism for rotating said sleeve and the reflector carried thereby, to vary the direction of the light rays reflected through said lens in accordance with the direction of travel of said automobile.

MARTIN R. HOAG.